United States Patent [19]

Dickie

[11] 4,286,480
[45] Sep. 1, 1981

[54] SPEED REDUCER

[75] Inventor: Ira A. Dickie, Goderich, Canada

[73] Assignee: Champion Road Machinery Limited, Goderich, Canada

[21] Appl. No.: 75,697

[22] Filed: Sep. 14, 1979

[51] Int. Cl.³ .............................................. F16H 57/10
[52] U.S. Cl. .................................... 74/785; 74/750 R
[58] Field of Search .................. 74/750 R, 785, 801, 74/355; 192/20

[56] References Cited

U.S. PATENT DOCUMENTS

| 1,479,292 | 1/1924 | Farley | 74/750 R |
| 2,066,952 | 1/1937 | Tornebohm | 74/750 R |
| 2,601,151 | 6/1952 | Keller | 74/750 R X |

Primary Examiner—Allan D. Herrmann

[57] ABSTRACT

The present invention discloses a speed reducer or multiplier for use in a motor grader. The unique structure of the reducer allows the device to be easily inserted in the drive train of a grader and thereby improve the feasible ground speeds at which the grader can operate satisfactorily. The structure further allows the speed of the planetary reduction system to remain idle when not in use. Thereby increasing the efficiency and decreasing problems such as wear. This is accomplished by a shifting mechanism which causes at least two gears to be engaged or disengaged.

8 Claims, 3 Drawing Figures

SPEED REDUCER

FIELD OF THE INVENTION

The present invention relates to transmissions and more particularly, to speed reducers for use in the power train of a motor grader.

BACKGROUND OF THE INVENTION

Motor graders are principally designed to be used in road building, however, due to their large size and stability, they have been adapted for other uses such as bank grading, pavements planning, brush cutting and snow blowing.

As one can appreciate, a grader loses power with age, due to wear, and no longer functions at maximum performance. This drop in power is particularly noticeable at lower engine r.p.m. and the operators tend to compensate for this reduction in power by increasing the engine r.p.m.'s and riding the clutch to avoid stalling the engine.

Although older graders may not be as versatile as new machines, they still find spot duty doing many of the lighter jobs such as light roadgrading, snow removal etc. In most cases the loss of power could be overcome by rebuilding the engine, however, this is normally not a feasible solution as other components of the grader have also worn and the reliability of the grader would not justify this investment. A number of accessories such as snow blowers, pavement planners and pavement rippers are available for a grader, however, the grader must be capable of operating at low vehicle ground speed and hence, low r.p.m.'s which is not always possible, as the power output is low at these engine r.p.m.'s causing the engine to stall when the load is applied.

The present invention overcomes this problem by introducing a speed reducer in the power train of the motor grader, such that the grader can operate at these reduced ground speeds while providing the required torque. When these characteristics are not required, the speed reducer may be disengaged returning the drive train to its original status. The device is particularly useful as the normal transmission ratios may be used for light functions and the speed reducer may be engaged when low ground speed, high torque functions are required. For example, the speed reducer would not be used when the grader is travelling to the job site, however, when on site the speed reducer would be engaged allowing the grader to fulfill the desired function.

SUMMARY OF THE INVENTION

The specification of the present invention discloses a speed reducer or multiplier comprising an input shaft, an output shaft, a planetary gear system and a movable power transfer member adapted to selectively engage either the input shaft and the output shaft whereby the planetary system freely rotates, or the output shaft and the planetary gear system. The arrangement is such that the engagement of said transfer member with the planetary gear system causes the engagement of the input shaft and the planetary gear system thereby changing the speed of the output shaft relative to the input shaft. The engagement of the transfer member with the input shaft causes the disengagement of the input shaft and the planetary system thus providing a non engaged free planetary system.

The speed reducer according to this design uses a moving transfer member which causes the planetary system to be disengaged or engaged at two points. Because of this arrangement, the planetary system is allowed to freewheel when not engaged thereby, reducing wear and reducing the power consumed.

The speed reducer allows an older motor grader to be modified increasing the range of ground speeds in which the grader can operate, thus increasing the versatility and useful life of the grader.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
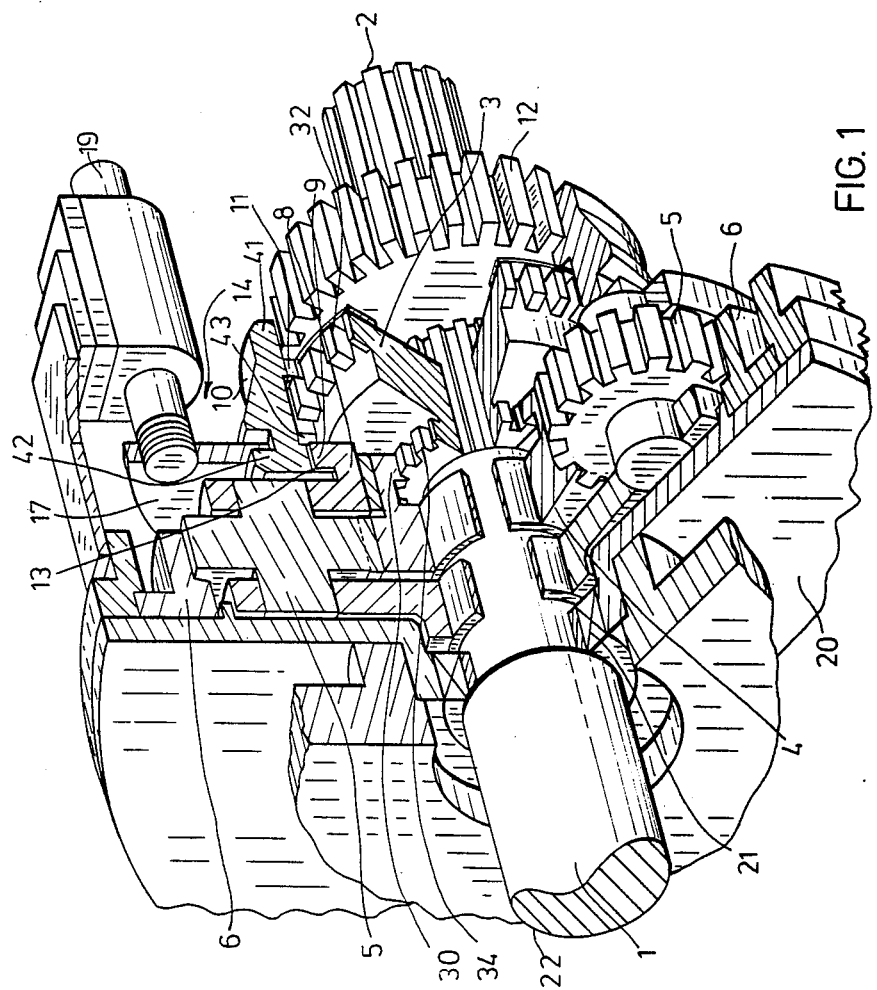
FIG. 1 is a perspective view of the speed reducer with a portion thereof, cut away.

As can be seen in FIG. 1, the speed reducer has an input shaft 1, an output shaft 2, a sliding power input member 3, a sun gear 4, planetary gears 5, a stationary ring gear 6, planetary gear frame member 8, power transfer member 10, power output gear 12 and shifting mechanism 14.

The casing 20 of the speed reducer has been provided with bearings 21 for supporting and positioning the input shaft 1. The power input gear 3, the sun gear 4, and planetary gear supporting structure 22 are all carried on the input shaft 1. The sun gear and the support structure 22 are bearingly supported on this shaft whereas, the power input gear 3 is splined to the input shaft such that it can slide in the axial direction of the shaft but cannot rotate on the shaft.

Figure 3:
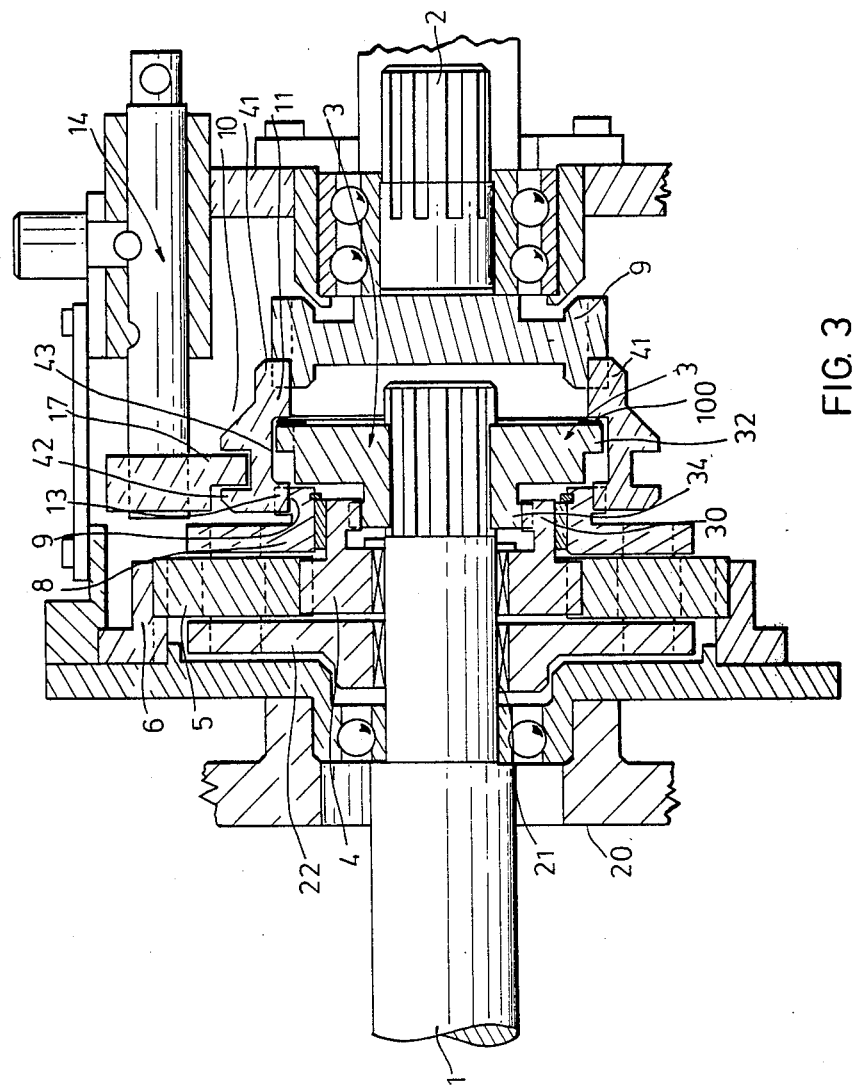
FIG. 3 is a cross-section taken through the speed reducer when the planetary system is engaged.

In the positions shown in FIGS. 1 and 3, the planetary gear system is coupled to the input and output shafts, thereby activating the speed reducer. In this position the power transfer member 10 has been moved forward and is meshing with gear 9 which is secured to the frame 8. The frame member 8 is connected and driven by the axes of the planetary gears. The power transfer member is engaging the power output gear 12 which will be the case regardless of whether the speed reducer is activated or the power is being directly transmitted through the speed reducer.

Due to the position of the power transfer member 10, the power input member 3 has been moved forward on the input shaft 1 such that gear 34 meshes with ring gear 30 which is fixed to the sun gear 4. As shown in the figures the power input members 3 has two gears, 32 and 34 of different diameters. Only one of these gears will be engaged at any one time, gear 34 transmitting power from the input shaft to the planetary gear system and gear 32 transmitting power through the transfer member 10 to the output gear 12.

Figure 2:
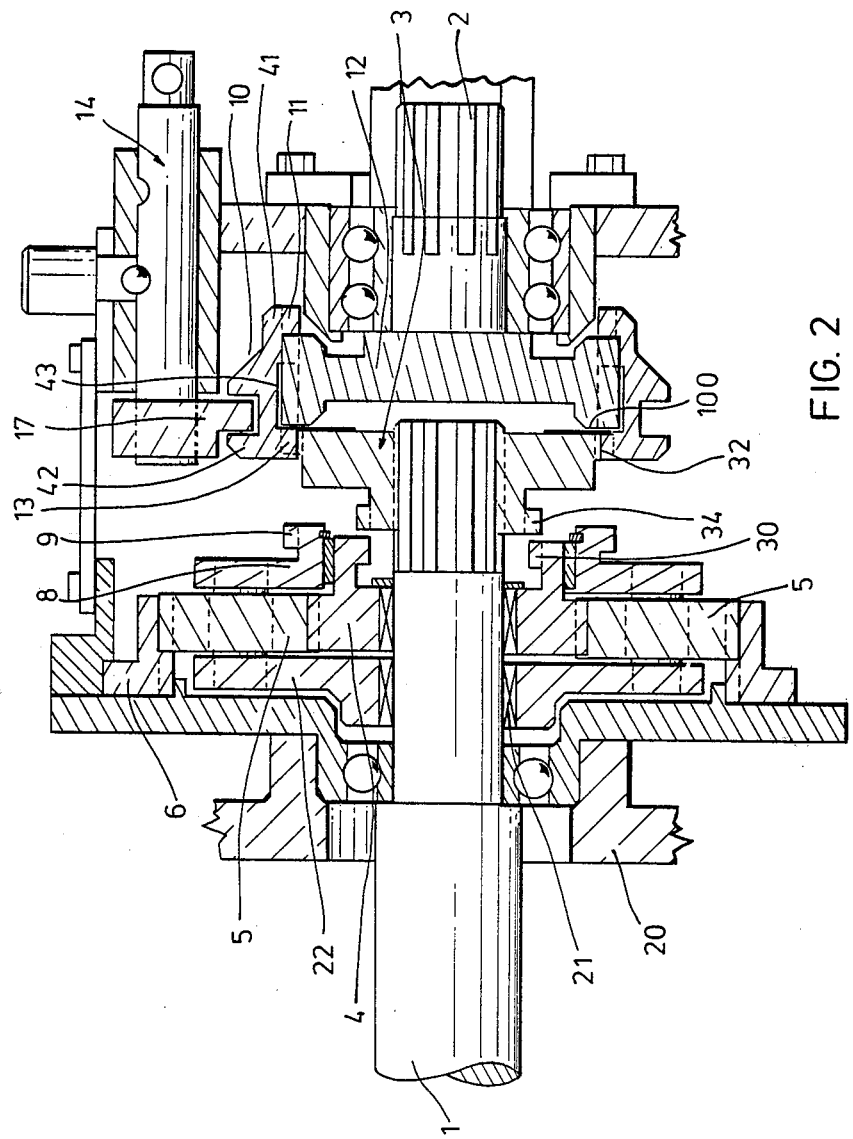
FIG. 2 is a cross-sectional view taken through the length of the speed reducer when the planetary system is not engaged.

As shown in FIGS. 2 and 3 a plate member 100 has been secured to the rear face of input member 3 enabling the power transfer member 10 to position the input member of the splined input shaft. When member 10 is moved from the direct drive position shown in FIG. 2 to the planetary gear system shown in FIG. 3 the gear teeth 11 of the transfer member 10 strike the plate member 100 forcing the input member 3 to slide on the input shaft activating the reducer by engaging gears 30 and 34 and disengaging the power transfer member 10 and gear 32. The system is returned to the direct drive position of FIG. 2 by moving the power transfer member in the opposite direction allowing gear teeth 13 to abut the plate member 100, moving the input member disengaging gears 30 and 34 and engaging gear 32 with the power transfer member.

The transfer member 10 comprises two coaxial ring gear portions 41 and 42 having gear teeth 11 and 13 respectively. Separating the ring gear portions is an annular sleeve 43 having a diameter greater than outer diameter of gear 32 and having an axial length greater than the thickness of the teeth of this gear, such that gear 32 may turn within the annular sleeve when not engaged.

The ring gear portion 42 is adapted to mesh with either input gear 32 or gear 9 secured to the frame member 8; gear 32 and gear 9 being of equal diameter.

As shown in FIGS. 1 and 3, the transfer member 10 has been moved forward, forcing gear 34 of the power input member to mesh with the planetary system. In this mode, power transferred from the input shaft to the planetary system via gears 30 and 34, to the power transfer member via gear 9 and subsequently to the output shaft.

In FIG. 2, the speed reducer is not activated and power is being directly transmitted to the output shaft 2. The transfer member 10 has been moved by the shift mechanism 14 such that the transfer member is no longer meshing with gear 9 and has now engaged gear 32 of the power input member 3. The movement of the transfer 10 has also caused the power input member 3 to move a similar axial direction, disengaging ring gear 30 and gear 34 of the power input member. Power is now transmitted from the input shaft to the transfer member 10 via gear 32 and subsequently to the output shaft.

Ring gear 30 and gear 9 of the frame member 8 have been disengaged thereby freeing the planetary gear system. It is only through this double disengagement caused by the movement of the power transfer member 10 and the subsequent movement of the power input member 3 combined with the sun gear bearingly supported on the input shaft that the planetary gear system may be isolated and not driven with the input shaft.

As can be appreciated, all functions do not require this higher torque for a given speed, and thus the operator must be capable of selectively engaging the speed reducer. With double disengagement, the planetary system is completely free to rotate, however, due to the friction within the system the planetary gear system will have little movement when not engaged.

Functions which require these improved torque characteristics at low speed, are often seasonal and therefore, there is no need to have the planetary system driven when the speed reducer is not activated, as power consumption and wear would increase.

The torque available at a given ground speed is increased due to the transmission of forces within the gear system as well as due to the power characteristics of the engine. The speed reducer allows the engine to operate at higher r.p.m.'s for a given ground speed and more power is available as engine speed initially increases. Therefore more power and torque is available due to the characteristics of the engine and speed reducer. The increased engine speed also allows other equipment of the grader such as the heater to function properly which would not be the case if engine speed was low.

Thus the speed reducer allows the engine to operate within its normal speed range while allowing the ground speed to be reduced for speciality jobs. It is normally anticipated that a speed reduction of approximately 3 to 1 will operate satisfactorily however, other reduction ratios are also possible. A torque arm (not shown) is secured to the casing of the speed reducer and secured to the grader locking the casing against rotation.

The transfer member 10 is positioned by the shifting mechanism 14 comprising a shifting fork 17 secured to connecting rod 19. The transfer member 10 has an outwardly facing annular groove for insertion of fork 17. The connecting rod will be controlled from the cab of the grader through a linkage mechanism allowing the operator to activate the system. The annular groove and shifting fork 17 provide a suitable connecting means allowing the transfer member to rotate while also allowing the fork member to be fixed with respect to rotation.

In its present application, the speed reducer will normally be positioned between the output of the engine and the transmission of the grader and therefore, the output shaft 2 has been adapted with a splined free end for direct engagement in the transmission of the grader. It is also noted that to avoid extensive modification costs the reducer has been designed to be as small as possible and only requires a gap of approximately 10 inches for insertion.

In adapting the motor grader, the drive shaft from the engine is shortened or replaced and the output shaft of the reducer directly inserted in the transmission. Therefore, the present system results in a very compact, speed reducer which can be quickly inserted in the power train of a motor grader without encountering major modification problems and excessive downtimes.

Because of the unique design of the system the speed reducer can be activated when required and at other times, will not be driven as the planetary system has been completely disengaged from the input and output shafts. Thus the present system is highly reliable and can improve the versatility of graders to allow them to satisfy the specialty functions required of them. This is particularly true of older motor graders which can now be adapted to fulfill these specialty functions in a more efficient manner.

The present invention has been described in relation to one particular application of the device, as a speed reducer in a motor grader, however, the invention could also be used as a speed multiplier if so desired. If used as a multiplier the improved torque characteristics would not be present although the double disengagement would still allow the planetary system to free wheel when not activated.

Although various embodiments of the invention have been described herein, in great detail, it will be appreciated by those skilled in the art that variations may be made thereto, without departing from the spirit of the invention or the scope of the appended claims.

The embodiments of the invention in which an exclusive property or privilege is claimed are defined as follows:

1. A speed multiplier or a reducer comprising an input shaft means, an output shaft means, a planetary gear system, and a movable power transfer member adapted to selectively engage either said input and output shaft means whereby said planetary system may freely rotate, or said output shaft means and said planetary gear system, the arrangement being such that the engagement of said transfer member with said planetary gear system causes the engagement of said input shaft means and planetary gear system thereby changing the speed of said output shaft means relative to said input shaft means, and the engagement of said transfer member with said input shaft means causes the disengagement of said input shaft means and said planetary system, providing a non engaged free planetary system.

2. A speed reducer or multiplier comprising an input shaft means and output shaft means, a planetary gear system and a moveable transfer member adapted to transmit power to said output shaft means and selectively engage either the planetary gear system or the input shaft means, said planetary gear system being activated by selective movement of said transfer member which engages said planetary system and transmits power to the output shaft means, the selective movement of said transfer member further causing the engagement of said input shaft means and said planetary system, the arrangement being such that said planetary gear system is free when not engaged by said input shaft means and said transfer member.

3. A speed reducer for use in a motor grader comprising splined input shaft carrying a splined sliding power input member, a power output shaft, a planetary gear system, a moveable power transfer member adapted to selectively coupled said output shaft with either said power input member or said planetary gear system, said planetary system comprising a sun gear, planetary gears, a stationary ring gear, and a frame means for coupling the axis of the planetary gears and adapted to transmit power to said power transfer member, said sun gear including means for engaging said power input member and being adapted to mesh therewith by moving said power input member on said input shaft, the arrangement being such that said planetary gear system is free to rotate when said transfer member couples said input and output shafts.

4. A speed reducer comprising an input shaft, an output shaft, a planetary gear system and a moveable power transfer member, the arrangement being such that the planetary system is only operative by selectively moving said transfer member, causing the coupling of said input shaft to said planetary system and the coupling of said transfer member and said planetary system, said transfer member coupling said input and output shafts by releasing the coupling of both the input shaft and the transfer member to the planetary system, thereby allowing said planetary to freely rotate.

5. A speed reducer or multiplier comprising an input shaft, an output shaft, a slideable power input member splined to said input shaft, a planetary gear system, a moveable transfer member adapted to transmit power to said output shaft and selectively engage either said planetary gear system or said power input member, the arrangement being such that the engagement of the transfer member and said planetary causes the engagement of said power input member and said planetary system, said planetary system including a sun gear bearingly supported on said input shaft, planetary gears, a stationary ring member meshing with said planetary gears, and frame member connecting the axes of said planetary gears and rotating about the input shaft and said planetary gears, said frame member including means for engaging said transfer member, said sun gear including means for engaging said input member the arrangement being such that said planetary system is free to rotate when power is directly transmitted from input shaft to output shaft via said transfer member.

6. A speed reducer or multiplier as claimed in claim 5 wherein said means for engaging said transfer member is a gear coaxial with said input shaft and rigidly secured to said frame member and adapted to mesh with a ring gear portion of said transfer member.

7. A speed reducer or multiplier as claimed in claim 5 wherein said input member comprises two co-axial input gears splined to said input shaft and of different diameters, one of said input gears adapted to mesh with a ring gear secured to the sun gear and the other input gear adapted to mesh with a ring gear portion of said transfer member.

8. A speed reducer or multiplier as claimed in claim 7 wherein said transfer member comprises two co-axial ring gear portions separated by an annular sleeve portion having a diameter greater than the outside diameter of the larger input gear and an axial length greater than the thickness of the teeth of the larger diameter input gear, one of said coaxial ring portions always meshing with the output shaft and the other selectively engaging either said large diameter input gear or said frame means, the arrangement being such that said large diameter input gear is located within said sleeve portion when said planetary system is engaged.

* * * * *